(12) United States Patent
Son

(10) Patent No.: US 7,561,563 B2
(45) Date of Patent: Jul. 14, 2009

(54) COMMUNICATION PATH SETTING METHOD AND COMMUNICATION PATH SETTING SYSTEM

(75) Inventor: Masayoshi Son, Tokyo (JP)

(73) Assignee: Softbank BB Corp., Tokyo (JP)

( * ) Notice: Subject to any disclaimer, the term of this patent is extended or adjusted under 35 U.S.C. 154(b) by 477 days.

(21) Appl. No.: 10/549,920

(22) PCT Filed: Nov. 21, 2003

(86) PCT No.: PCT/JP03/14938

§ 371 (c)(1),
(2), (4) Date: Jun. 6, 2006

(87) PCT Pub. No.: WO2004/084531

PCT Pub. Date: Sep. 30, 2004

(65) Prior Publication Data
US 2006/0268826 A1  Nov. 30, 2006

(30) Foreign Application Priority Data
Mar. 20, 2003  (JP)  ............................. 2003-078912

(51) Int. Cl.
*H04L 12/66* (2006.01)
(52) U.S. Cl. ..................... 370/352; 370/356; 370/218; 370/237
(58) Field of Classification Search ................. 370/352, 370/435, 238, 218, 237
See application file for complete search history.

(56) References Cited

U.S. PATENT DOCUMENTS

| | | | | |
|---|---|---|---|---|
| 5,953,312 A | * | 9/1999 | Crawley et al. | 370/218 |
| 6,137,792 A | * | 10/2000 | Jonas et al. | 370/354 |
| 6,282,192 B1 | * | 8/2001 | Murphy et al. | 370/352 |
| 6,954,453 B1 | * | 10/2005 | Schindler et al. | 370/352 |

FOREIGN PATENT DOCUMENTS

| | | |
|---|---|---|
| JP | 11-284728 | 10/1999 |
| JP | 2003-298735 | 10/2003 |
| JP | 2004-56775 | 2/2004 |

* cited by examiner

*Primary Examiner*—Curtis Kuntz
*Assistant Examiner*—Phung-Hoang J Nguyen
(74) *Attorney, Agent, or Firm*—Maier & Maier, PLLC

(57) ABSTRACT

When a connection request is sent from a telephone terminal, even if it is difficult to set a communication path to the destination telephone terminal only through the packet network, a circuit switching network is also used in cooperation with the packet network in order to set a communication path therethrough, so that call loss is prevented from occurring.

In accordance with the communication path setting system of the present invention, when it is determined that an ADSL modem 22 connected to a VoIP network 1 is not operating, the MGC 62 sets a communication path between a telephone terminal 11 and a telephone terminal 12 through the VoIP network 1, a public switched telephone network 2 and a voice band signal processing unit 230 of the ADSL modem 22. In the same manner, when it is determined that the MGC 62 is not operating, the MGC 61 sets a communication path between the telephone terminal 11 and the telephone terminal 12 through the VoIP network 1, the public switched telephone network 2 and the voice band signal processing unit 230 of the ADSL modem 22.

10 Claims, 8 Drawing Sheets

COMMUNICATION PATH SETTING METHOD AND COMMUNICATION PATH SETTING SYSTEM

TECHNICAL FIELD

The present invention relates to a communication path setting method and a communication path setting system between telephone terminal systems in a communication network in which a packet network and a circuit switching network are connected through a gateway device.

BACKGROUND ART

With the development of Internet technologies in recent years, telephone services enabled by making use of a network (IP network) on the basis of Internet Protocol (IP) have been proposed in addition to the conventional telephone services on the basis of the circuit switching system enabled by making use of a circuit switching network (public switched telephone network PSTN).

In the case of such a telephone service making use of a packet network, a communication path connectable to a telephone terminal (including a facsimile terminal and the like) in a predetermined area of the packet network is set by the use of a connection control device, i.e., a so-called call agent (MGC), which is associated with the predetermined area (referring, for example, to "A. Arango, A. Duran, I. Elliott, C. Huitema, S. Pickett, Media Gateway Control Protocol (MGCP) Version 1.0, IETF RFC2705, October 1999").

Also, the telephone terminal can transmit and receive packet signals by being connected with a Voice over IP (VoIP) conversion unit which serves to perform conversion between voice band signals and packet signals. Furthermore, the VoIP conversion unit is provided with a port through which it is connected to the packet network for transmitting and receiving packet signals, and a port through which it is connected to a circuit switching network for transmitting and receiving voice band signals. A telephone terminal connected to such a VoIP conversion unit can make use of both the packet network and the circuit switching network.

Furthermore, with the advent of the wide bandwidths of communication networks, xDSL modems are widely distributed to realize high speed digital communications by the use of copper telephone cables in a subscriber line area. Along with the release of the telephone service making use of a packet network and the popularization of xDSL modems, xDSL modems serving also as a VoIP conversion unit as described above have been provided.

Also, the packet network and the circuit switching network as described above are connected through a gateway device which performs the conversion of communication signals and the conversion of call control procedure (signaling protocol). It is possible to provide a communication link between a telephone terminal connected to the packet network and a telephone terminal connected to the circuit switching network, i.e., a public switched telephone network by connecting the packet network and the circuit switching network.

However, a connection request for setting a communication path between telephone terminals is issued from the caller telephone terminal, when there is a failure to perform the operation of the port of a VoIP conversion unit through which the packet network is connected in the destination side or the operation of a connection control device serving to set a communication path to the VoIP conversion unit in the destination side, then there is a problem that the connection request cannot be granted even though the communication path could be set between the telephone terminals through the packet network and the circuit switching network.

The present invention is invented taking into consideration the above circumstances. It is an object of the present invention to provide a communication path setting method and a communication path setting system capable of preventing call loss by judging the operating condition of a VoIP conversion unit or a connection control device, and making use of a circuit switching network in cooperation with the packet network in order to set a communication path therethrough in the case where it is difficult to set a communication path to the destination telephone terminal only through a packet network.

SUMMARY OF THE INVENTION

In order to accomplish the above objects and other objects, the present invention has the following features.

At first, in accordance with a first feature of the present invention, a communication path setting method serves to set a communication path between a first telephone terminal system connected to a packet network and a second telephone terminal system connected to a circuit switching network and said circuit switching network, wherein said packet network and said circuit switching network are connected through a gateway device which performs predetermined signal conversion, said second telephone terminal system being provided with a first port connected to said packet network and a second port connected to said circuit switching network, said communication path setting method comprising: a step (A) in which said first control device receives a connection request for connecting said second telephone terminal system from said first telephone terminal system; a step (B) in which said first control device transmits said connection request to said second control device through said packet network; a step (C) in which said second control device determines whether or not said first port is operating in response to said connection request; and a step (D) in which, when it is determined in said step (C) that said first port is not operating, said second control device sets said communication path through said packet network, said circuit switching network and said second port by the use of said gateway device.

Particularly, in the case of the first feature of the present invention, it is preferred that said second control device sets, in said step (D), said communication path by the use of said gateway device which is associated with said second control device.

Since the second control device sets a communication path through the packet network, the circuit switching network and the port of the destination telephone terminal system connected to the circuit switching network in the case where the port of the destination telephone terminal system connected to the packet network is not operating due to a failure or another reason, the above feature makes it possible to prevent call loss from occurring even when the port of the destination telephone terminal system is not operating without quitting the setting of a communication path.

In accordance with a second feature of the present invention, the communication path setting method of the first feature of the present invention further comprises: a step (E) in which said first control device determines, through said packet network, whether or not said second control device is operating in response to said connection request; and a step (F) in which, when it is determined in said step (E) that said second control device is not operating, said first control device sets said communication path through said packet network, said circuit switching network and said second port by the use of said gateway device.

Particularly, in the case of the second feature of the present invention, it is preferred that said first control device sets, in said step (F), said communication path by the use of said gateway device which is associated with said first control device.

Since the first control device sets a communication path through the packet network, the circuit switching network and the port of the destination telephone terminal system connected to the circuit switching network in the case where the second control device is not operating due to a failure or another reason, the above feature makes it possible to prevent call loss from occurring even when the second control device is not operating without quitting the setting of a communication path.

In accordance with a third feature of the present invention, the communication path setting method of the first feature of the present invention further comprises: a step of notifying to said first telephone terminal system whether said packet network alone or both said packet network and said circuit switching network is used as a route through which said communication path is set.

Since the route of the communication path as set is notified to the destination telephone terminal, the above feature enables the user of the telephone terminal which transmits the connection request to easily and immediately know whether the packet network alone or both the packet network and the circuit switching network is used as a route through which the communication path is set.

In accordance with a fourth feature of the present invention, a communication path setting system serves to set a communication path between a first telephone terminal system connected to a packet network and a second telephone terminal system connected to a circuit switching network and said circuit switching network, wherein said packet network and said circuit switching network are connected through a gateway device which performs predetermined signal conversion, said second telephone terminal system is provided with a first port connected to said packet network and a second port connected to said circuit switching network, said first control device comprising: a receiving unit that receives a connection request for connecting said second telephone terminal system from said first telephone terminal system; and a request transmitting unit that transmitting said connection request to said second control device through said packet network, said second control device comprising: a first determination unit that determines whether or not said first port is operating in response to said connection request; and a first setting unit that sets said communication path through said packet network, said circuit switching network and said second port by the use of said gateway device when said first determination unit determines that said first port is not operating.

Particularly, in the case of the fourth feature of the present invention, it is preferred that said first setting unit sets said communication path by the use of said gateway device which is associated with said second control device.

Particularly, in accordance with a fifth feature of the present invention on the basis of the second feature of the present invention, it is preferred that said first control device comprises: a second determination unit that determines, through said packet network, whether or not said second control device is operating in response to said connection request; and a second setting unit that sets said communication path through said packet network, said circuit switching network and said second port by the use of said gateway device when said second determination unit determines that said second control device is not operating.

Particularly, in the case of the fifth feature of the present invention, it is preferred that said first setting unit sets said communication path by the use of said gateway device which is associated with said second control device.

In accordance with a sixth feature of the present invention on the basis of the fifth feature of the present invention, it is preferred to further provide a notification unit that notifies to said first telephone terminal system whether said packet network alone or both said packet network and said circuit switching network is used as a route through which said communication path is set.

BEST MODE FOR CARRYING OUT THE INVENTION (Network Configuration Including the Communication Path Setting System in Accordance with the Present Embodiment)

Figure 1:
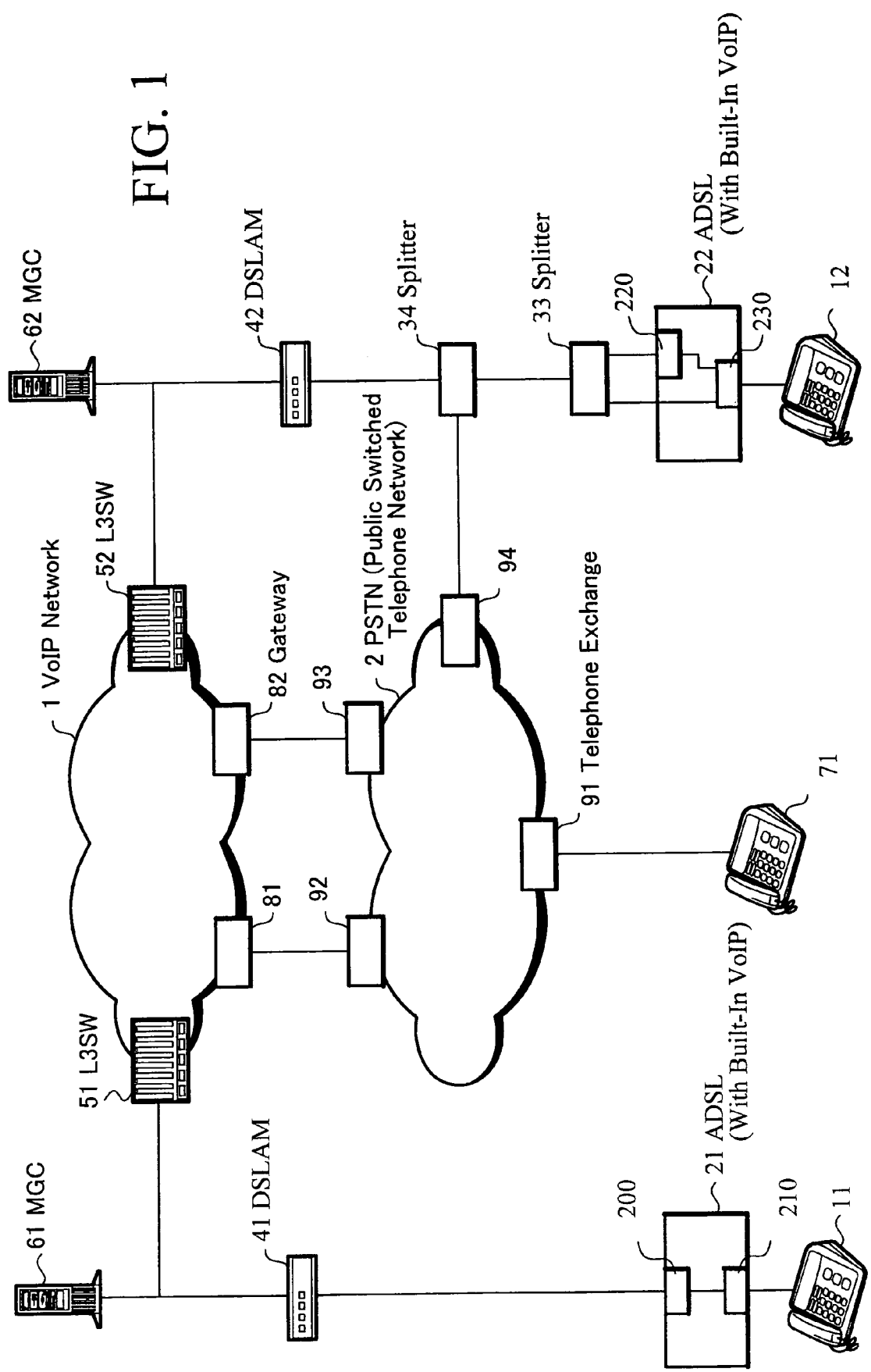
FIG. 1 is a view showing the schematic configuration of a network including a communication path setting system in accordance with an embodiment of the present invention.

An embodiment of the present invention will be explained with reference to the accompanying drawings. FIG. 1 is a view showing the schematic configuration of a network including a communication path setting system in accordance with the present embodiment.

As shown in the figure, in the case of the present embodiment, a telephone terminal 12 which transmits and receives voice band signals is connected to an ADSL modem 22 which is provided with a conversion processing unit 220 (first port) and a voice band signal processing unit 230 (second port) and performs high speed digital communications through a metallic subscriber line. Incidentally, in the case of the present embodiment, the telephone terminal 12 and the ADSL modem 22 serves as a second telephone terminal system in combination.

The voice band signal processing unit 230 transmits voice band signals as received from the telephone terminal 12 to the conversion processing unit 220, and the same voice band signals directly to the network side (the splitter 33). Conversely, the voice band signal processing unit 230 transmits voice band signal as received from the conversion processing unit 220 or the network side to the telephone terminal 12.

Furthermore, the voice band signal processing unit 230 in accordance with the present embodiment is configured to pass voice band signals between the telephone terminal 12 and the network side (the splitter 33) without conversion by bypassing the ADSL modem 22 even when the ADSL modem 22 is not powered.

The conversion processing unit 220 has the function, i.e., a VoIP function, of converting voice band signals as received from the telephone terminal 12 through the voice band signal processing unit 230 to IP packets, and transmits the IP packets to the network side (the splitter 33) as signals modulated to meet the predetermined standard of ADSL modem. Conversely, the conversion processing unit 220 demodulates modulated signals as received from the network side to IP packets, converts the IP packets to voice band signals and transmit the voice band signal to the voice band signal processing unit 230. Incidentally, for example, an ADSL modem in conformity with ITU-T G.992.1 Annex A.ex can be used as the ADSL modem 22.

The ADSL modem 22 is connected to the public switched telephone network 2 (circuit switching network) through the splitters 33 and 34 which separate and reassemble voice band signals and modulated signals. Furthermore, the ADSL modem 22 is connected to a VoIP network 1 through a DSLAM 42 comprising a collection of ADSL modems for performing the conversion between modulated signals and IP packets.

On the other hand, an ADSL modem 21 has the same functionality as the ADSL modem 22 and is provided with a conversion processing unit 200 and a voice band signal processing unit 210. Also, a telephone terminal 11 is connected to the VoIP network 1 through the ADSL modem 21 and a DSLAM 41. In the case of the present embodiment, the telephone terminal 11 and the ADSL modem 21 serve as a first telephone terminal system in combination. Meanwhile, in the case of the present embodiment, the telephone terminal 11 is not connected to the public switched telephone network 2. However, the telephone terminal 12 can be connected to the public switched telephone network 2 by making use of a splitter in the same manner as the telephone terminal 12.

In the case of the present embodiment, the VoIP network 1 is a communication network which transmits and receives IP packets prepared by converting voice band signals, and is implemented with L3SWs 51 and 52 each of which is a layer 3 switch capable of transmitting an IP packet as received to a predetermined port which is designated on the basis of the destination IP address and so forth. Alternatively, needless to say, the VoIP network 1 can be implemented with routers in place of the layer 3 switches.

On the other hand, in the case of the present embodiment, the public switched telephone network 2 is a communication network which is implemented with a circuit switching system comprising telephone exchanges 91 to 94, and serves as a telephone service network called as a subscription telephone network or PSTN (Public Switched Telephone Network).

Also, the VoIP network 1 and the public switched telephone network 2 are connected through a gateway 81 and a gateway 82 provided on the VoIP network 1. More specifically speaking, while the gateway 81 is connected to the telephone exchange 92, the gateway 82 is connected to the telephone exchange 93.

The gateway 81 and the gateway 82 can perform the conversion between IP packets transmitted and received through the VoIP network 1 and PCM signals transmitted and received in a predetermined format (for example, in conformity with ITU-T G.711) through the public switched telephone network 2. In addition, the gateway 81 and the gateway 82 can perform the conversion between the call control protocol (for example, MGCP) used in the VoIP network 1 and the common channel signaling system (for example, ITU-T No.7) used in the public switched telephone network 2. The communication path setting system in accordance with the present embodiment can provide a communication path through the VoIP network 1 and the public switched telephone network 2 by the functionality provided in the gateway 81 and the gateway 82 as described above.

An MGC 61 (first control device) serves to manage telephone terminals located in a predetermined area of the VoIP network 1 in order to set communication paths in the predetermined area. In the case of the present embodiment, the MGC 61 manages the telephone terminal 11 and the gateway 81 connected to the L3SW 51. In addition, the MGC 61 receives a connection request from the telephone terminal 11, and sets a communication path between the telephone terminal 11 and the telephone terminal 12 in cooperation with an MGC 62 (second control device) which manages the telephone terminal 12.

On the other hand, the MGC 62 manages the telephone terminal 12 and the gateway 82 connected to the L3SW 52, and sets the communication path between the telephone terminal 11 and the telephone terminal 12 in cooperation with the MGC 61 in response to a connection request from the MGC 61.

Also, in the case of the present embodiment, there is a telephone terminal 71 which is a subscription telephone only of the public switched telephone network 2 and connected to the telephone exchange 91. For example, in the case where the MGC 61 receives a request from the telephone terminal 11 for connecting the telephone terminal 71, the MGC 61 sets a communication path between the telephone terminal 11 and the telephone terminal 71 through the VoIP network 1 and the public switched telephone network 2 via the gateway 81 managed by the MGC 61.

(Configuration of the Control Device in Accordance with the Present Embodiment)

Next, referring to FIGS. 2 and 3, the configuration of the control device in accordance with the present embodiment will be explained.

Figure 2:
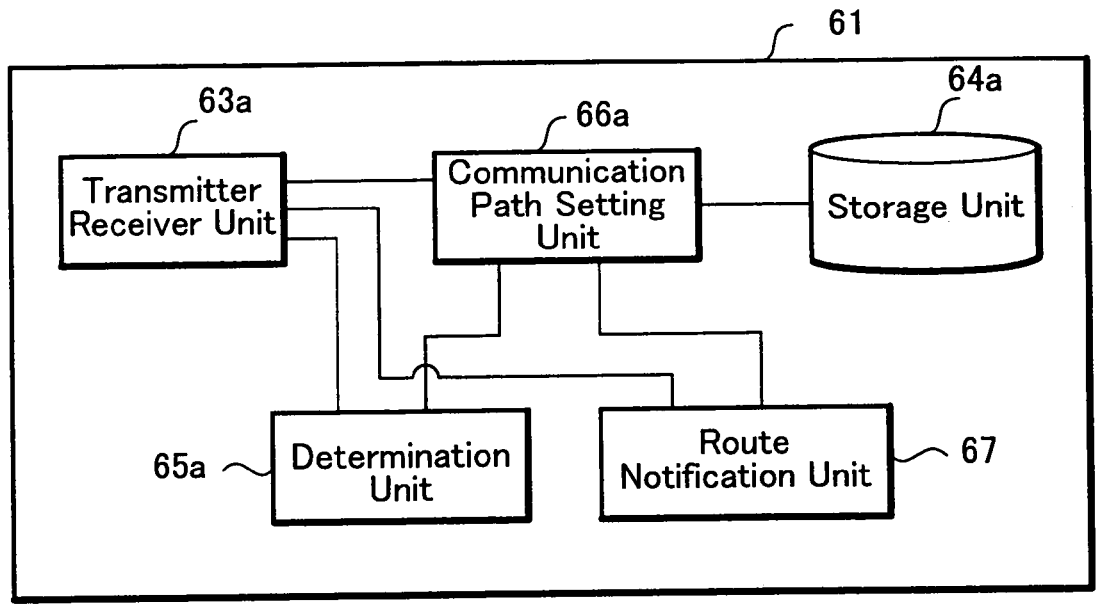
FIG. 2 is a block diagram showing the configuration of the logic functions of a control device (MGC) in accordance with the embodiment of the present invention.
Figure 3:
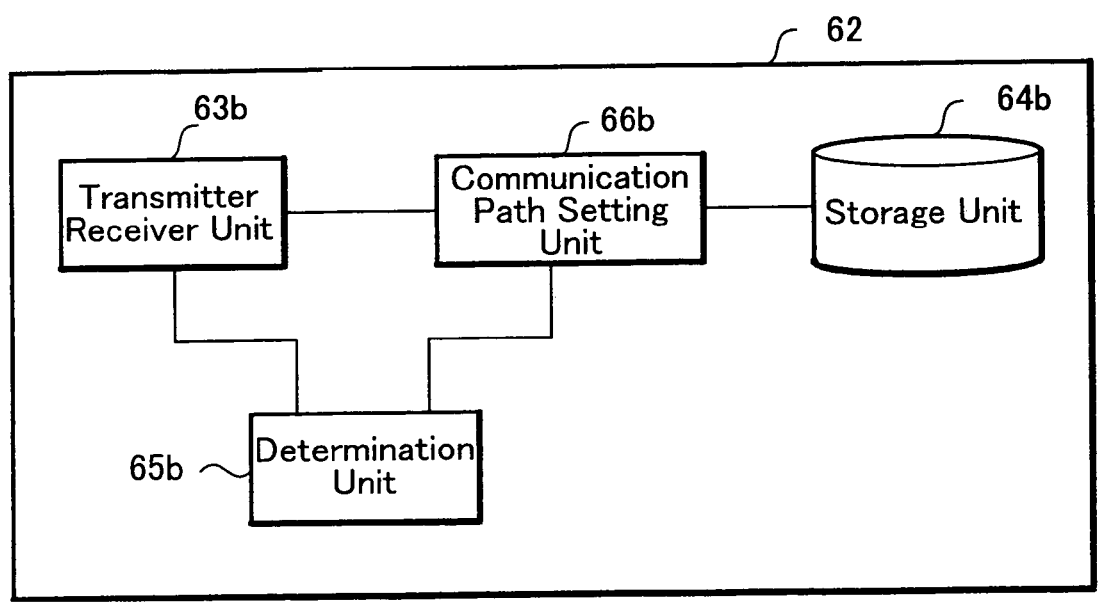
FIG. 3 is a block diagram showing the configuration of the logic functions of a control device (MGC) in accordance with the embodiment of the present invention.

FIGS. 2 and 3 are block diagrams showing the configurations of the logic functions of the MGC 61 and the MGC 62 in accordance with the present embodiment.

As shown in FIG. 2, the MGC 61 includes a transmitter receiver unit 63*a*, a storage unit 64*a*, a determination unit 65*a*, a communication path setting unit 66*a*, and a route notification unit 67.

The transmitter receiver unit 63*a* serves to receive a request from the telephone terminal 11 for connecting the telephone terminal 12 through the VoIP network 1, and serves as receiver means in the case of the present embodiment. Also, the transmitter receiver unit 63*a* serves to transmit and receive IP packets to and from the ADSL modem 21, the MGC 62 and the gateway 81. More specifically speaking, the transmitter receiver unit 63a is connected to the L3SW 51 by a LAN interface such as 100Base-TX in order to transmit and receive IP packets to and from the ADSL modem 21, the MGC 62 and the gateway 81.

The storage unit 64a stores the telephone number assigned to the telephone terminal 11 in association with the IP address assigned to the ADSL modem 21 which is connected to the telephone terminal 11. Also, in the case of the present embodiment, the storage unit 64a also stores the IP address of the gateway 81 managed by the MGC 61 and the telephone number of the telephone terminal 71 associated with the IP address, together with the IP address of the MGC 62.

The determination unit 65a serves to determine, through the VoIP network 1 in response to a connection request from the telephone terminal 11, whether or not the MGC 62 is operating, and serves as second determination means in the case of the present embodiment.

For example, in the case of MGCP, the determination unit 65a confirms whether or not the MGC 62 responds to a CRCX (Create Connection) command transmitted to the MGC 62 by the communication path setting unit 66a within a predetermined time period. If the MGC 62 does not respond to the CRCX command within 1.5 seconds after the CRCX command is transmitted, the determination unit 65a determines that the MGC 62 is not operating. The determination unit 65a notifies the communication path setting unit 66a of the result of determination as to whether or not the MGC 62 is operating.

The communication path setting unit 66a serves to transfer a connection request from the telephone terminal 11 to the MGC 62 through the VoIP network 1, and serves as request transmission means in the case of the present embodiment. Also, if the determination unit 65a determines that the MGC 62 is not operating, the communication path setting unit 66a makes use of the gateway 81 to set a communication path between the telephone terminal 11 and the telephone terminal 12 through the VoIP network 1, the public switched telephone network 2 and the voice band signal processing unit 230 of the ADSL modem 22, and serves as second setting means in the case of the present embodiment.

More specifically speaking, the communication path setting unit 66a confirms whether or not the telephone number of the telephone terminal 12 is stored in the storage unit 64a, in response to the connection request from the telephone terminal 11 through the transmitter receiver unit 63a. In the case where the telephone number of the telephone terminal 12 is not stored in the storage unit 64a, the communication path setting unit 66a determines that the telephone terminal 12 is managed by the MGC 62. The communication path setting unit 66a then transmits the connection request from the telephone terminal 11 to the MGC 62 together with the IP address of the ADSL modem 21 and the port number to be used.

On the other hand, if the determination unit 65a determines that the MGC 62 is not operating, the communication path setting unit 66a transmits the connection request from the telephone terminal 11 to the gateway 81 together with the IP address of the ADSL modem 21 and the port number to be used.

Furthermore, if the communication path setting unit 66a receives a response from the gateway 81 that a communication path to the telephone terminal 12 can be set, the communication path setting unit 66a notifies the ADSL modem 21 of the IP address of the gateway 81 and the port number to be used. In addition, the communication path setting unit 66a can notify the ADSL modem 21 of the IP address of the gateway 82 and the port number to be used as notified by the MGC 62.

The route notification unit 67 serves to notify the telephone terminal 11 whether the VoIP network 1 alone or both the VoIP network 1 and the public switched telephone network 2 is used to set a communication path between the telephone terminal 11 and the telephone terminal 12, and serves as notification means in the case of the present embodiment.

More specifically speaking, the route notification unit 67 receives from the communication path setting unit 66a the information about whether the VoIP network 1 alone or both the VoIP network 1 and the public switched telephone network 2 is used to set a communication path between the telephone terminal 11 and the telephone terminal 12. Furthermore, the route notification unit 67 transmits an IP packet indicative of the type of the set route of a communication path to the ADSL modem 21 on the basis of the information as received from the communication path setting unit 66a. The ADSL modem 21 transmits a predetermined voice band signal (for example, a tone signal or an audio guidance) to the telephone terminal 11 from the conversion processing unit 200 through the voice band signal processing unit 210 on the basis of the IP packet as received.

In the case where a communication path between the telephone terminal 11 and the telephone terminal 12 is set through the VoIP network 1 and the public switched telephone network 2, the route notification unit 67 transmits, for example, an MDCX (Modify Connection) command twice to the ADSL modem 21 in accordance with MGCP. On the other hand, in the case where the communication path is set through the VoIP network 1 alone, the route notification unit 67 transmits the MDCX (Modify Connection) command once.

The route notification unit 67 transmits the IP packet corresponding to the route of the communication path as set, while the ADSL modem 21 outputs a voice band signal corresponding to the IP packet to the telephone terminal 11, and therefore the user of the telephone terminal 11 can easily know the route of the communication path to the telephone terminal 12. In addition, the user of the telephone terminal 11 can roughly estimate the communication cost incurred for voice conversation by taking into consideration the route of the communication path.

Next, as shown in FIG. 3, the MGC 62 includes a transmitter receiver unit 63b, a storage unit 64b, a determination unit 65b and a communication path setting unit 66b.

The transmitter receiver unit 63b serves to transmit and receive IP packets to and from the ADSL modem 22, the MGC 61 and the gateway 82. More specifically speaking, the transmitter receiver unit 63b is connected to the L3SW 52 by a LAN interface such as 100Base-TX in order to transmit and receive IP packets to and from the ADSL modem 22, the MGC 61 and the gateway 82.

The storage unit 64b stores the telephone number assigned to the telephone terminal 12 in association with the IP address assigned to the ADSL modem 22 which is connected to the telephone terminal 12. Also, in the case of the present embodiment, the storage unit 64b stores the IP address of the MGC 61.

The determination unit 65b serves to determine, in response to a connection request from the telephone terminal 11 as notified by the MGC 61, whether or not the conversion processing unit 220 of the ADSL modem 22 is operating, and serves as first determination means in the case of the present embodiment.

For example, in the case of MGCP, the determination unit 65b confirms whether or not the conversion processing unit 220 responds to a CRCX command transmitted to the conversion processing unit 220 by the communication path setting unit 66b within a predetermined time period. If the conversion processing unit 220 does not respond to the CRCX command within 1.5 seconds after the CRCX command is transmitted, the determination unit 65b determines that the conversion processing unit 220 is not operating. The determination unit 65b notifies the communication path setting unit 66b of the result of determination as to whether or not the conversion processing unit 220 is operating.

Also, if the determination unit 65b determines that the conversion processing unit 220 is not operating, the communication path setting unit 66b makes use of the gateway 82 to set a communication path between the telephone terminal 11 and the telephone terminal 12 through the VoIP network 1, the public switched telephone network 2 and the voice band signal processing unit 230 of the ADSL modem 22, and serves as second setting means in the case of the present embodiment.

More specifically speaking, the communication path setting unit 66b acquires the IP address associated with the telephone number of the telephone terminal 12 from the storage unit 64b in response to the connection request from the telephone terminal 11 as notified by the MGC 61. The communication path setting unit 66b transmits a calling request (CRCX command) for calling the telephone terminal 12 to the conversion processing unit 220 of the ADSL modem 22 on the basis of the IP address as acquired. If a response to the calling request from the conversion processing unit 220 is received, the communication path setting unit 66b sets a communication path between the telephone terminal 11 and the telephone terminal 12 through the VoIP network 1 and the conversion processing unit 220.

On the other hand, if the determination unit 65b determines that the conversion processing unit 220 is not operating, the communication path setting unit 66b transmits the connection request from the telephone terminal 11 to the gateway 82 managed by the MGC 62 together with the IP address of the ADSL modem 21 and the port number to be used.

Furthermore, if the communication path setting unit 66b receives a response from the gateway 82 that a communication path to the telephone terminal 12 can be set, the communication path setting unit 66b notifies the MGC 61 of the IP address of the gateway 82 and the port number to be used.

(Communication Path Setting Method Using the Communication Path Setting System in Accordance with the Present Embodiment)

Next, with reference to FIGS. 4 and 7, the communication path setting method using the communication path setting system in accordance with the present embodiment will be explained.

First of all, with reference to FIGS. 4 and 5, the communication path setting method will be explained in the case where a communication path is set between the telephone terminal 11 and the telephone terminal 12 when the MGC 62 is not operating.

Figure 4:
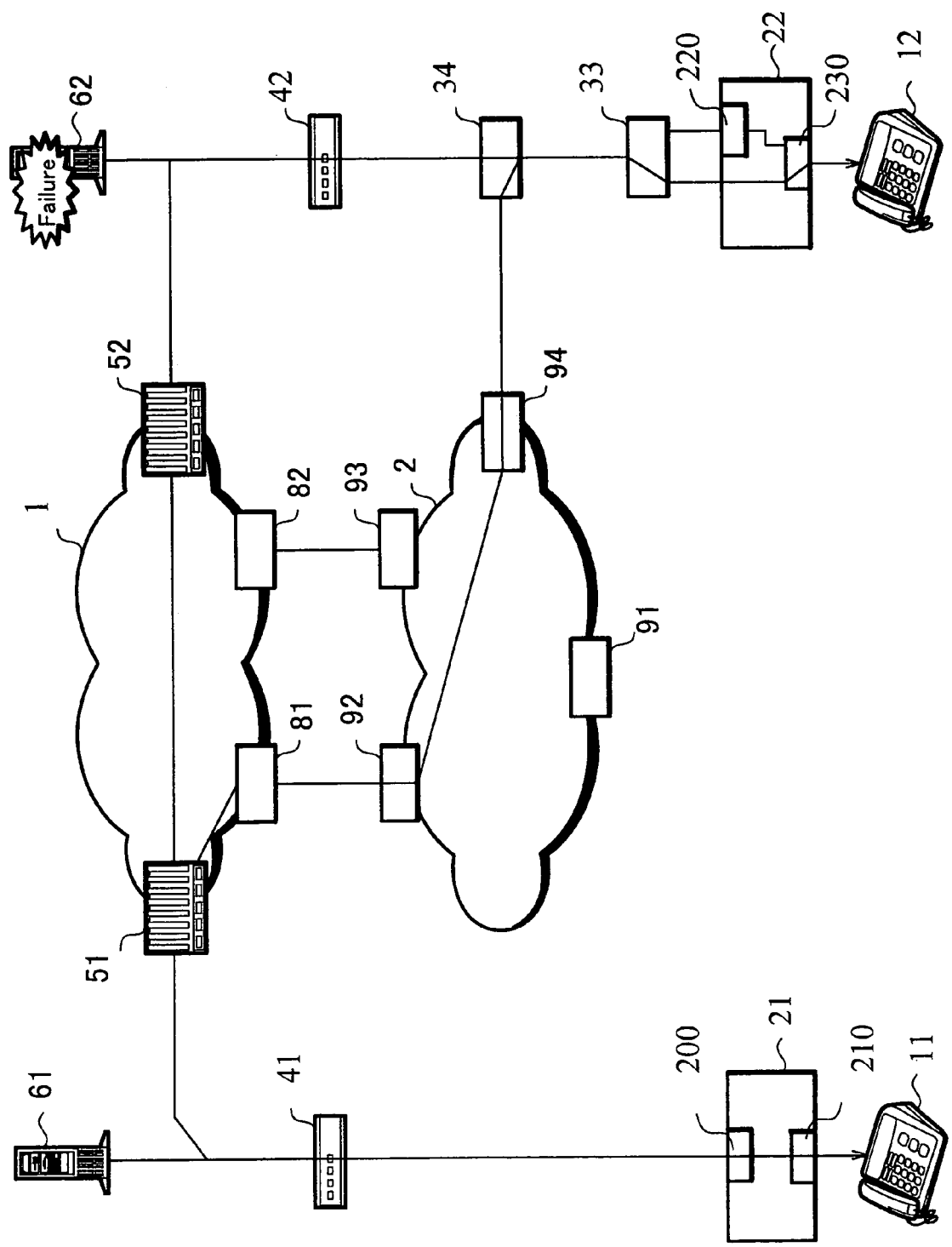
FIG. 4 is a view showing the route of a path which is set when the control device is not operating in accordance with the embodiment of the present invention.

FIG. 4 shows the route of a path (illustrated with a dashed line in the figure) which is set between the telephone terminal 11 and the telephone terminal 12 when the MGC 62 is not operating. In this case, the case when the MGC 62 is not operating is, for example, the case when there is a failure in the MGC 62.

As has been discussed above, when the MGC 62 is not operating, a connection request from the telephone terminal 11 is received by the MGC 61, which then sets a communication path between the telephone terminal 11 and the telephone terminal 12 through the VoIP network 1, the public switched telephone network 2 and the voice band signal processing unit 230 of the ADSL modem 22 by making use of the gateway 81. Meanwhile, the chain line in the figure shows the route of the communication path which is set between the telephone terminal 11 and the telephone terminal 12 when the MGC 62 is operating.

Figure 5:
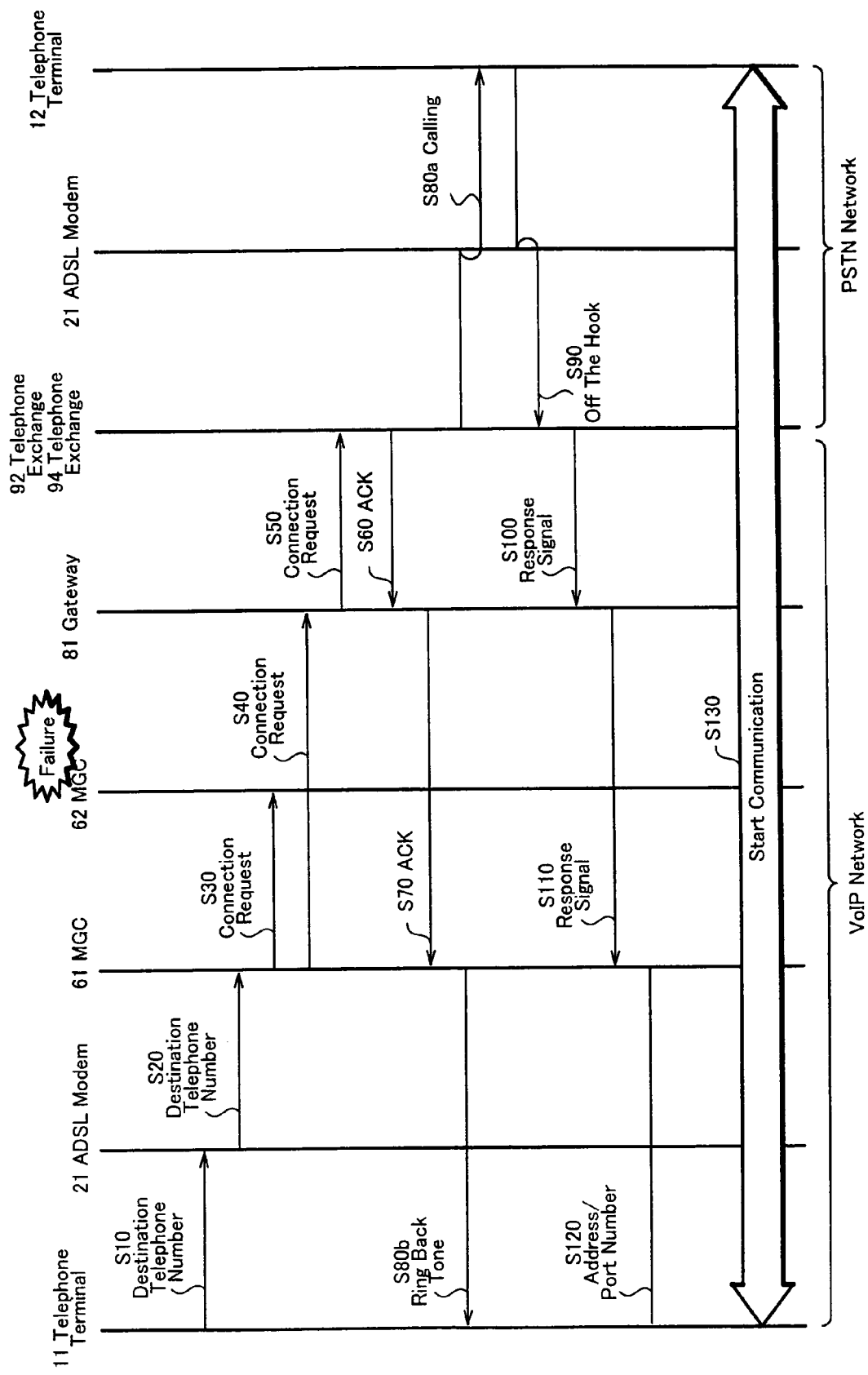
FIG. 5 is a view showing a sequence of steps taken for setting a communication path when the control device is not operating in accordance with the embodiment of the present invention.

FIG. 5 shows a sequence of steps taken when a communication path is set in accordance with the route as illustrated in FIG. 4. First of all, the telephone terminal 11 transmits the telephone number of the telephone terminal 12 to the ADSL modem 21 in step S10. The ADSL modem 21 converts the telephone number as received from the telephone terminal 11 to an IP packet and transmits the IP packet to the MGC 61 as a request for connecting the telephone terminal 12 in step S20. When receiving the connection request, the MGC 61 determines that the telephone terminal 12 is managed by the MGC 62, and transmits the connection request to the MGC 62 in step S30.

Next, the MGC 61 determines that the MGC 62 is not operating on the basis of the fact that no response to the connection request is returned from the MGC 62, and transmits the connection request to the gateway 81 in step S40. Meanwhile, as has been discussed above, the determination by the MGC 61 as to whether or not the MGC 62 is operating can be implemented on the basis of the determination as to whether or not the MGC 62 responds to a CRCX (Create Connection) command transmitted to the MGC 62 by the MGC 61 within a predetermined time period.

The gateway 81 transmits the connection request as received from the MGC 61 to the telephone exchange 92 connected to the gateway 81 in step S50 The telephone exchange 94 which receives the connection request from the telephone exchange 92 confirms that the telephone terminal 12 is not busy for communication, and returns to the gateway 81 through the telephone exchange 92 a response (ACK) indicating that a communication path to the telephone terminal 12 can be set in step S60. Next, in response to the response as received from the telephone exchange 94, the gateway 81 returns to the MGC 61 a response (ACK) indicating that a communication path to the telephone terminal 12 can be set in step S70.

In addition, the telephone exchange 94 calls the telephone terminal 12 through the ADSL modem 22 on the basis of the connection request as received from the gateway 81 in step S80a. Also, the MGC 61 transmits a ring back tone (calling signal) to the telephone terminal 11 in step S80b on the basis of the response as received in step S70.

Next, when the telephone terminal 12 is off the hook in response to the call in step S80a, the telephone exchange 94 detects the off-hook state in step S90 and transmits to the gateway 81 a reply signal indicating that the telephone terminal 12 responds to the call in step S100. The gateway 81 transmits the reply signal as received from the telephone exchange 94 through the telephone exchange 92 to the MGC 61 in step S110. The MGC 61 notifies the ADSL modem 21 (the conversion processing unit 200) of the IP address of the gateway 81 and the port number to be used in response to the reply signal from the gateway 81 in step S120.

Then, the ADSL modem 21 converts voice band signals, which are transmitted from the telephone terminal 11 to the telephone terminal 12, to IP packets, and transmits the IP packets to the gateway 81 by the use of the IP address of the gateway 81 and the port number to be used as notified by the MGC 61.

On the other hand, the gateway 81 converts the IP packets as received from the ADSL modem 21 to PCM signals which can be processed by the public switched telephone network 2, and transmits the PCM signals to the telephone exchange 92. Also, the gateway 81 converts, to IP packets, the PCM signals as received from the telephone exchange 92 and addressed to the telephone terminal 11 and transmits the IP packets to the ADSL modem 21 by the use of the IP address of the ADSL modem 21 and the port number to be used which are included in the connection request received from the MGC 61 in step S40. In this way, a communication path between the telephone terminal 11 and the telephone terminal 12 is set through the VoIP network 1 and the public switched telephone network 2, and a communication between the telephone terminal 11 and the telephone terminal 12 is started in step S130.

Next, with reference to FIGS. 6 and 7, the communication path setting method will be explained in the case where a communication path is set between the telephone terminal 11 and the telephone terminal 12 when the conversion processing unit 220 of the ADSL modem 22 is not operating.

Figure 6:
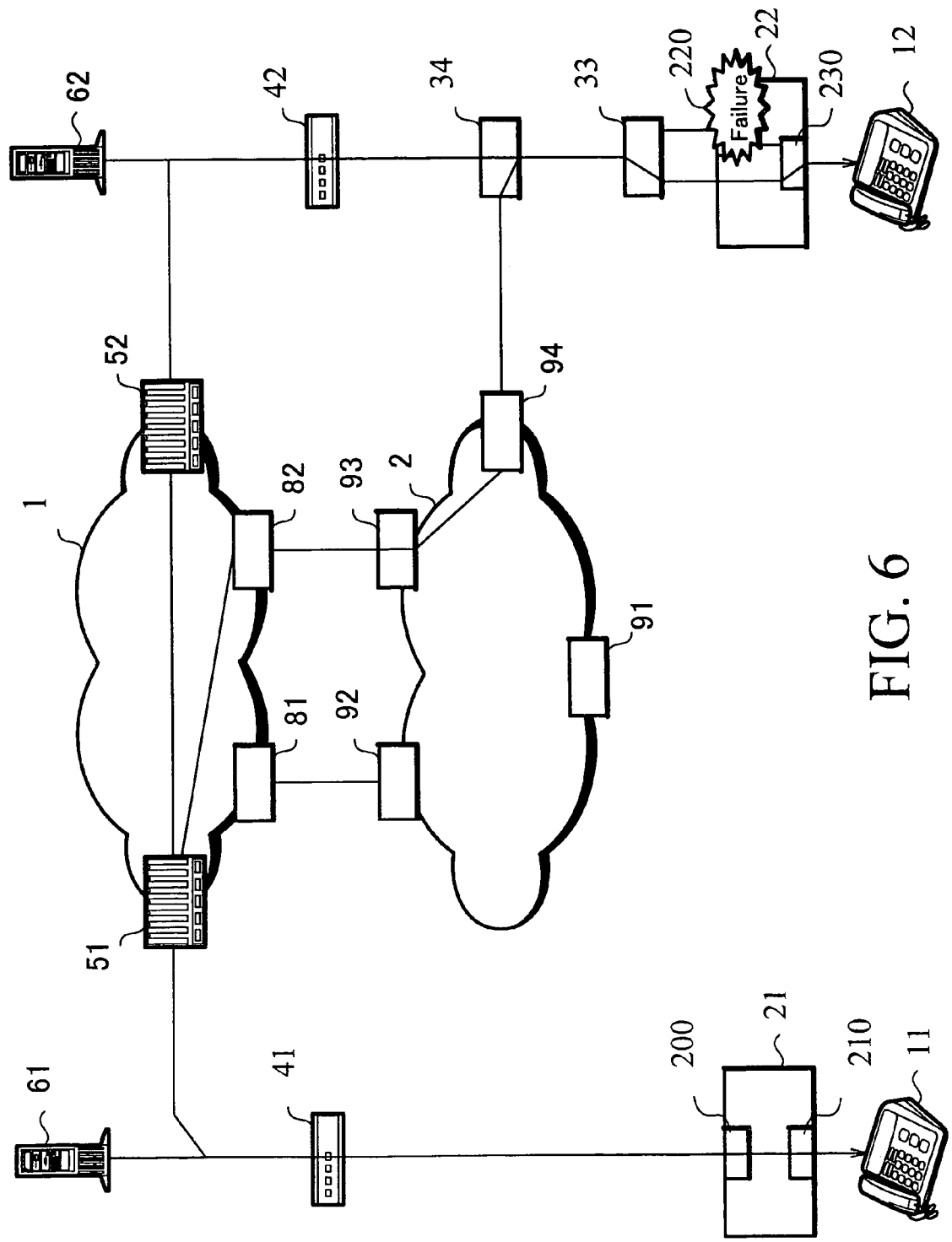
FIG. 6 is a view showing the set route of a communication path which is set when the conversion processing unit of an ADSL modem is not operating in accordance with the embodiment of the present invention.

FIG. 6 shows the route of a path (illustrated with a dashed line in the figure) which is set between the telephone terminal 11 and the telephone terminal 12 when the conversion processing unit 220 is not operating. In this case, the case when the conversion processing unit 220 is not operating is, for example, the case when there is a failure in the conversion processing unit 220, or the case when the ADSL modem 22 is not powered.

Incidentally, in the case of the present embodiment, the ADSL modem 22 is configured to pass voice band signals between the telephone terminal 12 and the network side (the splitter 33) without conversion.

As has been discussed above, when the conversion processing unit 220 is not operating, a connection request from the telephone terminal 11 is passed through the MGC 61 and received by the MGC 62, which then sets a communication path between the telephone terminal 11 and the telephone terminal 12 through the VoIP network 1, the public switched telephone network 2 and the voice band signal processing unit 230 of the ADSL modem 22 by making use of the gateway 82. Meanwhile, the chain line in the figure shows the route of the communication path which is set between the telephone terminal 11 and the telephone terminal 12 when the conversion processing unit 220 is operating.

Figure 7:
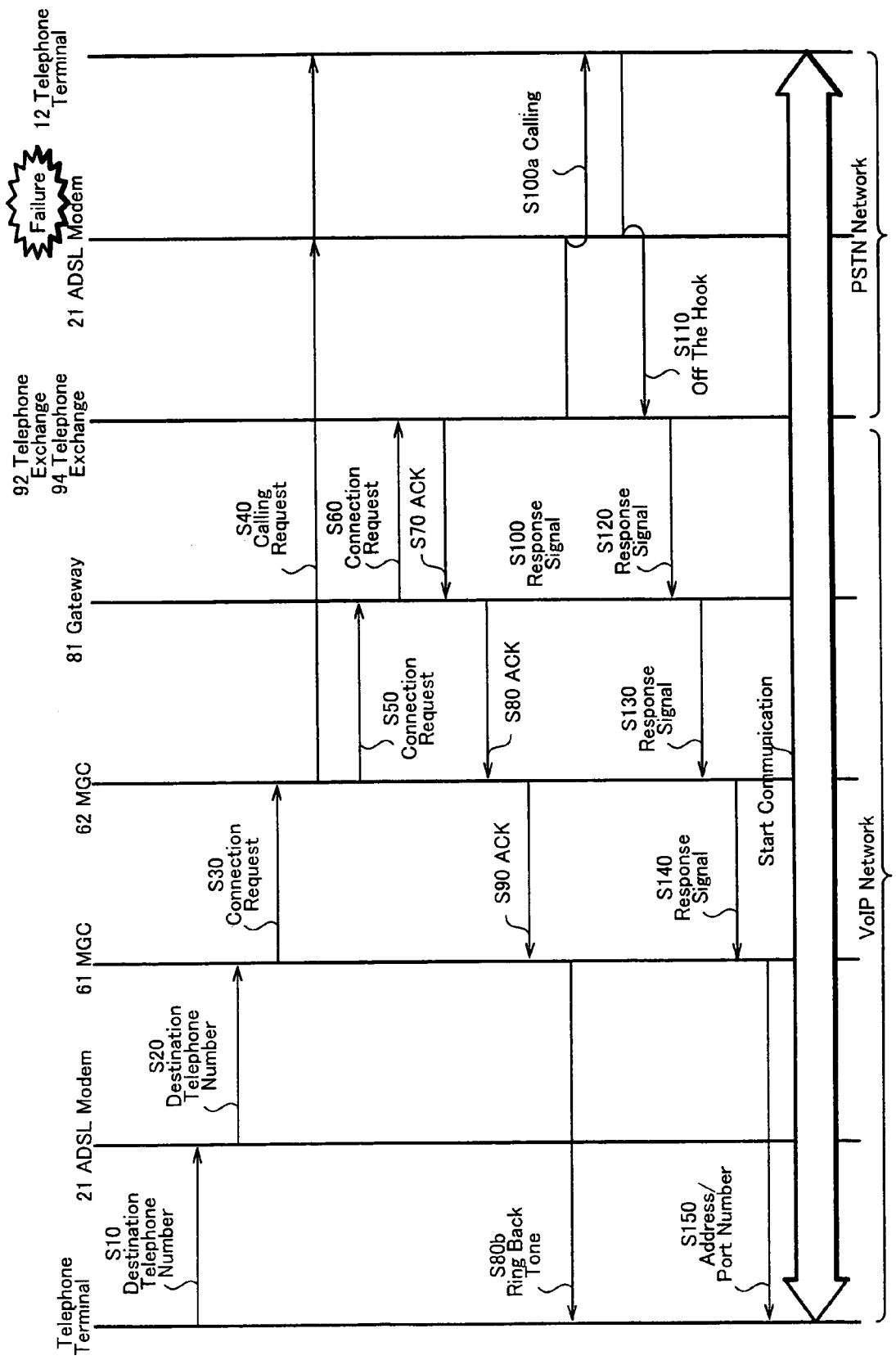
FIG. 7 is a view showing a sequence of steps taken for setting a communication path when the conversion processing unit of an ADSL modem is not operating in accordance with the embodiment of the present invention.

FIG. 7 shows a sequence of steps taken when a communication path is set in accordance with the route as illustrated in FIG. 6. First of all, the telephone terminal 11 transmits the telephone number of the telephone terminal 12 to the ADSL modem 21 in step S10. The ADSL modem 21 converts the telephone number as received from the telephone terminal 11 to an IP packet and transmits it to the MGC 61 as a request for connecting the telephone terminal 12 in step S20. When receiving the connection request, the MGC 61 determines that the telephone terminal 12 is managed by the MGC 62, and transmits the connection request to the MGC 62 in step S30.

Next, the MGC 62 receiving the connection request acquires the IP address of the ADSL modem 22 associated with the telephone number of the telephone terminal 12, and transmits a request for calling the telephone terminal 12 to the ADSL modem 22 in step S40.

Next, the MGC 62 determines that the conversion processing unit 220 of the ADSL modem 22 is not operating on the basis of the fact that no response to the calling request is returned from the conversion processing unit 220, and transmits the connection request to the gateway 82 in step S50. Meanwhile, as has been discussed above, the determination by the MGC 62 as to whether or not the conversion processing unit 220 is operating can be implemented on the basis of the determination as to whether or not the conversion processing unit 220 responds to a CRCX (Create Connection) command transmitted to the conversion processing unit 220 by the MGC 62 within a predetermined time period.

The gateway 82 transmits the connection request as received from the MGC 62 to the telephone exchange 93 connected to the gateway 82 in step S60. The telephone exchange 94 which receives the connection request from the telephone exchange 93 confirms that the telephone terminal 12 is not busy for communication, and returns to the gateway 82 a response (ACK) indicating that a communication path to the telephone terminal 12 can be set in step S70. Next, in response to the response as received from the telephone exchange 94, the gateway 82 returns to the MGC 62 a response (ACK) indicating that a communication path to the telephone terminal 12 can be set in step S80.

Then, in response to the response as received from the gateway 82, the MGC 62 returns to the MGC 61 a response (ACK) indicating that a communication path to the telephone terminal 12 can be set in step S90.

In addition, the telephone exchange 94 calls the telephone terminal 12 through the ADSL modem 22 on the basis of the connection request as received from the gateway 82 in step S100a. Also, the MGC 61 transmits a ring back tone (calling signal) to the telephone terminal 11 in step S100b on the basis of the response as received in step S90.

Next, when the telephone terminal 12 is off the hook in response to the call in step S100a, the telephone exchange 94 detects the off-hook state in step S110 and transmits to the gateway 82 a reply signal indicating that the telephone terminal 12 responds to the call in step S120.

The gateway 82 transmits the reply signal as received from the telephone exchange 94 through the telephone exchange 93 to the MGC 62 in step S130. Furthermore, the MGC 62 transmits the reply signal as received from the gateway 82 to the MGC 61 in step S140. The MGC 61 notifies the ADSL modem 21 (the conversion processing unit 200) of the IP address of the gateway 82 and the port number to be used in response to the reply signal from the MGC 62 in step S150.

Then, the ADSL modem 21 converts voice band signals, which are transmitted from the telephone terminal 11 to the telephone terminal 12, to IP packets, and transmits the IP packets to the gateway 82 by the use of the IP address of the gateway 82 and the port number to be used as notified by the MGC 61.

On the other hand, the gateway 82 converts the IP packets as received from the ADSL modem 21 to PCM signals which can be processed by the public switched telephone network 2, and transmits the PCM signals to the telephone exchange 93. Also, the gateway 82 converts, to IP packets, the PCM signals as received from the telephone exchange 93 and addressed to the telephone terminal 11 and transmits the IP packets to the ADSL modem 21 by the use of the IP address of the ADSL modem 21 and the port number to be used which are included in the connection request received from the MGC 62 in step S50. In this way, a communication path between the telephone terminal 11 and the telephone terminal 12 is set through the VoIP network 1 and the public switched telephone network 2, and a communication between the telephone terminal 11 and the telephone terminal 12 is started in step S160.

(Exemplary Modification)

Figure 8:
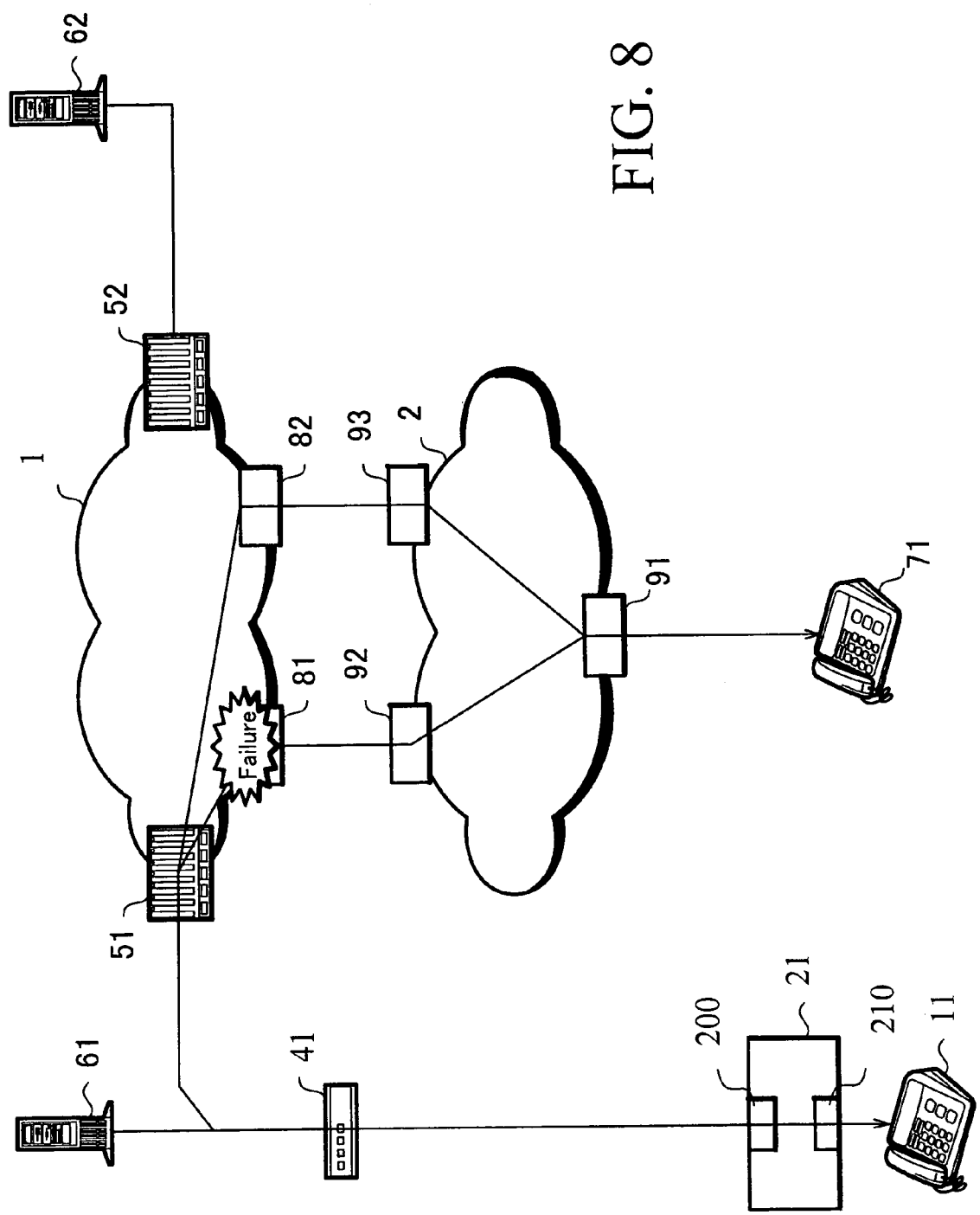
FIG. 8 is a view showing the set route of a communication path which is set when a gateway device is not operating in accordance with the embodiment of the present invention.

The communication path setting method using the communication path setting system in accordance with the present embodiment can be applied to the case as illustrated in FIG. 8.

FIG. 8 shows the route of a path (illustrated with a dashed line in the figure) which is set between the telephone terminal 11 and the telephone terminal 71 connected to the public switched telephone network 2 when the gateway 81 is not operating. Meanwhile, the chain line in the figure shows the route of the communication path which is set between the telephone terminal 11 and the telephone terminal 71 when the gateway 81 is operating.

In this configuration as illustrated in FIG. 8, when the gateway 81 is operating, a connection request from the telephone terminal 11 is received by the MGC 61, which then sets a communication path between the telephone terminal 11 and the telephone terminal 71 through the VoIP network 1 and the public switched telephone network by making use of the gateway 81.

On the other hand, when the gateway 81 is not operating, the MGC 61 notifies the MGC 62 of a connection request from the telephone terminal 11. The MGC 62 sets a communication path between the telephone terminal 11 and the telephone terminal 71 through the VoIP network 1 and the public switched telephone network 2 by the use of the gateway 82 on the basis of the connection request as notified.

Figure 9:
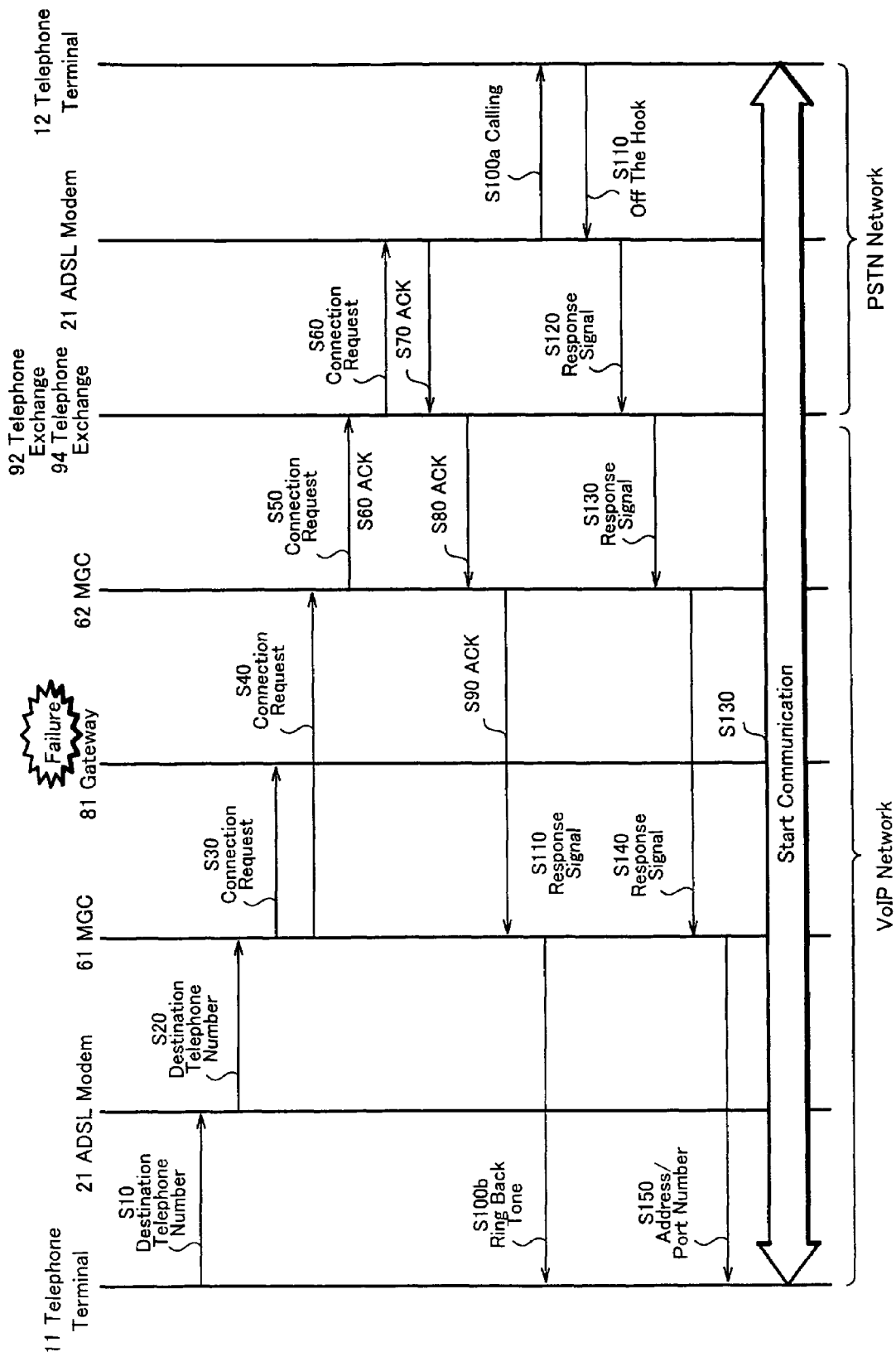
FIG. 9 is a view showing a sequence of steps taken for setting a communication path when a gateway device is not operating in accordance with the embodiment of the present invention.

FIG. 9 shows a sequence of steps taken when a communication path is set in accordance with the route as illustrated in FIG. 8. First of all, the telephone terminal 11 transmits the telephone number of the telephone terminal 71 to the ADSL modem 21 in step S10. The ADSL modem 21 converts the telephone number as received from the telephone terminal 11 to an IP packet and transmits it to the MGC 61 as a request for connecting the telephone terminal 71 in step S20. The MGC 61 which receives the connection request from the telephone terminal 11 confirms that the telephone number of the telephone terminal 71 is associated with the gateway 81, and transmits the connection request to the gateway 81 in step S30.

Next, since there is no response to the connection request from the gateway 81, the MGC 61 determines that the gateway 81 is not operating, and transmits the connection request to the MGC 62 in step S40. Meanwhile, the determination by the MGC 61 as to whether or not the gateway 81 is operating can be implemented on the basis of the determination as to whether or not the gateway 81 responds to a CRCX command transmitted to the gateway 81 by the MGC 61 within a predetermined time period. Incidentally, the MGC 61 can transmit the connection request to the MGC 62 also in the case where the MGC 61 receives from the gateway 81 a response (return code 403) indicating that there is no available channel which can be used for communication with the telephone exchange 92.

Next, the MGC 62 transmits the connection request to the gateway 82 in step S50. The gateway 82 transmits the connection request as received from the MGC 62 to the telephone exchange 93 connected to the gateway 82 in step S60. The telephone exchange 91 which receives the connection request from the telephone exchange 93 confirms that the telephone terminal 71 is not busy for communication, and returns to the gateway 82 a response (ACK) indicating that a communication path to the telephone terminal 71 can be set in step S70. Next, in response to the response as received from the telephone exchange 91, the gateway 82 returns to the MGC 62 a response (ACK) indicating that a communication path to the telephone terminal 71 can be set in step S80.

Furthermore, in response to the response as received from the gateway 82, the MGC 62 returns to the MGC 61 a response (ACK) indicating that a communication path to the telephone terminal 71 can be set in step S90.

On the other hand, the telephone exchange 91 calls the telephone terminal 71 on the basis of the connection request as received from the gateway 82 in step S100a. In addition, the MGC 61 transmits a ring back tone (calling signal) to the telephone terminal 11 in step S100b on the basis of the response received in step S90.

Next, when the telephone terminal 71 is off the hook in response to the call in step S100a, the telephone exchange 91 detects the off-hook state in step S110 and transmits to the gateway 82 a reply signal indicating that the telephone terminal 71 responds to the call in step S120.

The gateway 82 transmits the reply signal received from the telephone exchange 91 to the MGC 62 in step S130. Furthermore, the MGC 62 transmits the reply signal received from the gateway 82 to the MGC 61 in step S140. The MGC 61 notifies the ADSL modem 21 (the conversion processing unit 200) of the IP address of the gateway 82 and the port number to be used in response to the reply signal from the MGC 62 in step S150.

Then, the ADSL modem 21 converts voice band signals, which are transmitted from the telephone terminal 11 to the telephone terminal 71, to IP packets, and transmits the IP packets to the gateway 82 by the use of the IP address of the gateway 82 and the port number to be used as notified by the MGC 61.

On the other hand, the gateway 82 converts the IP packets as received from the ADSL modem 21 to PCM signals which can be processed by the public switched telephone network 2, and transmits the PCM signals to the telephone exchange 93. Also, the gateway 82 converts the PCM signals as received from the telephone exchange 93 and addressed to the telephone terminal 11 to IP packets, and transmits the IP packets to the ADSL modem 21 by the use of the IP address of the ADSL modem 21 and the port number to be used which are included in the connection request received from the MGC 61 in step S50. In this way, a communication path between the telephone terminal 11 and the telephone terminal 71 is set through the VoIP network 1 and the public switched telephone network 2, and a communication between the telephone terminal 11 and the telephone terminal 71 is started in step S160.

(Effects And Advantages of the Communication Path Setting System and the Communication Path Setting Method in Accordance with the Present Embodiment)

As has been discussed above, in accordance with the communication path setting system and the communication path setting method of the present embodiment, when the conversion processing unit 220 of the ADSL modem 22 connected to the VoIP network 1 is not operating due to a failure or another reason, the MGC 62 sets a communication path through the VoIP network 1, the public switched telephone network 2 and the voice band signal processing unit 230 of the ADSL modem 22 in cooperation with the gateway 82, and it is possible to prevent call loss from occurring even when the conversion processing unit 220 is not operating due to a failure or another reason without quitting the setting of a communication path.

Also, in the case of the present embodiment, when the MGC 62 is not operating due to a failure or another reason, the MGC 61 sets a communication path through the VoIP network 1, the public switched telephone network 2 and the voice band signal processing unit 230 of the ADSL modem 22 in cooperation with the gateway 81, and it is possible to prevent call loss from occurring even when the MGC 62 is not operating due to a failure or another reason without quitting the setting of a communication path.

Furthermore, in the case of the present embodiment, since the route of the communication path as set is notified to the telephone terminal 11 as a caller terminal, the user of the telephone terminal 11 transmitting the connection request can easily and immediately know whether the VoIP network 1 alone or both the VoIP network 1 and the public switched telephone network 2 is used as a route through which the communication path is set.

INDUSTRIAL APPLICABILITY

As has been discussed above, in accordance with the present invention, the operating condition of a VoIP conversion unit or a connection control device is judged, and if it is difficult to set a communication path to the destination telephone terminal only through a packet network, a circuit switching network is also used in cooperation with the packet network in order to set a communication path therethrough, and thereby it is possible to provide a communication path setting method and a communication path setting system capable of preventing call loss.

What is claimed is:

1. A communication path setting method of setting a communication path between a first telephone terminal system connected to a packet network and a second telephone terminal system connected to a circuit switching network and said circuit switching network, wherein said packet network and said circuit switching network are connected through a gateway device which performs predetermined signal conversion, said second telephone terminal system being provided with a first port connected to said packet network for performing conversion between voice band signals and packet signals, and a second port connected to said circuit switching network for transmitting and receiving voice band signals, said first port is configured to pass voice band signals to said circuit switching network by bypassing when said first port is not working, said communication path setting method comprising:

a step (A) in which said first control device receives a connection request for connecting said second telephone terminal system from said first telephone terminal system;

a step (B) in which said first control device transmits said connection request to said second control device through said packet network;

a step (C) in which said second control device determines whether or not said first port is operating in response to said connection request;

a step (D) in which, when it is determined in said step (C) that said first port is not operating, said second control device sets said communication path through said packet network, said circuit switching network and said second port by the use of said gateway device;

a step (E) in which said first control device determines, through said packet network, whether or not said second control device is operating in response to said connection request; and a step (F) in which, when it is determined in said step (E) that said second control device is not operating, said first control device sets said communication path through said packet network, said circuit switching network and said second port by the use of said gateway device; and wherein said second control device sets, in said step (D), said communication path by the use of said gateway device which is associated with said second control device; and wherein said first control device sets, in said step (F), said communication path by the use of said gateway device which is associated with said first control device.

2. The communication path setting method as claimed in claim 1 further comprising a step of notifying to said first telephone terminal system whether said packet network alone or both said packet network and said circuit switching network is used as a route through which said communication path is set.

3. A communication path setting system that sets a communication path between a first telephone terminal system connected to a packet network and a second telephone terminal system connected to a circuit switching network and said circuit switching network, wherein said packet network and said circuit switching network are connected through a gateway device which performs predetermined signal conversion, said second telephone terminal system is provided with a first port connected to said packet network for performing conversion between voice band signals and a packet signals, and a second port connected to said circuit switching network for transmitting and receiving voice band signals, said first port is configured to pass voice band signals to said circuit switching network by bypassing when said first port is not working, said first control device comprising:

a receiving unit that receives a connection request for connecting said second telephone terminal system from said first telephone terminal system;

a request transmitting unit that transmitting transmits said connection request to said second control device through said packet network, a second determination unit that determines, through said packet network, whether or not said second control device is operating in response to said connection request; and a second setting unit that sets said communication path through said packet network, said circuit switching network and said second port by the use of said gateway device when said second determination unit determines that said second control device is not operating, said second control device comprising:

a first determination unit that determines whether or not said first port is operating in response to said connection request; and a first setting unit that sets said communication path through said packet network, said circuit switching network and said second port by the use of said gateway device when said first determination unit determines that said first port is not operating and wherein said first setting unit sets said communication path by the use of said gateway device which is associated with said second control device; and wherein said second setting unit sets said communication path by the use of said gateway device which is associated with said first control device.

4. The communication path setting system as claimed in claim 3 further comprising a notification unit that notifies to said first telephone terminal system whether said packet network alone or both said packet network and said circuit switching network is used as a route through which said communication path is set.

5. The communication path setting method as claimed in claim 1 further comprising a step of notifying to said first telephone terminal system whether said packet network alone or both said packet network and said circuit switching network is used as a route through which said communication path is set.

6. The communication path setting method as claimed in claim 1 further comprising a step of notifying to said first telephone terminal system whether said packet network alone or both said packet network and said circuit switching network is used as a route through which said communication path is set.

7. The communication path setting method as claimed in claim 1 further comprising a step of notifying to said first telephone terminal system whether said packet network alone or both said packet network and said circuit switching network is used as a route through which said communication path is set.

8. The communication path setting system as claimed in claim 3 further comprising a notification unit that notifies to said first telephone terminal system whether said packet network alone or both said packet network and said circuit switching network is used as a route through which said communication path is set.

9. The communication path setting system as claimed in claim 6 further comprising a notification unit that notifies to said first telephone terminal system whether said packet network alone or both said packet network and said circuit switching network is used as a route through which said communication path is set.

10. The communication path setting system as claimed in claim 3 further comprising a notification unit that notifies to said first telephone terminal system whether said packet network alone or both said packet network and said circuit switching network is used as a route through which said communication path is set.

* * * * *